United States Patent [19]

Teichman

[11] Patent Number: 5,256,286
[45] Date of Patent: Oct. 26, 1993

[54] SHALLOW WATER OIL-SKIMMING BARGE

[76] Inventor: Rudy Teichman, Rte. 2, Box 308, Galveston, Tex. 77554

[21] Appl. No.: 918,608

[22] Filed: Jul. 27, 1992

[51] Int. Cl.⁵ .............................................. E02B 15/04
[52] U.S. Cl. ................................. 210/242.3; 210/923
[58] Field of Search ................... 210/170, 242.3, 776, 210/923, 411, 242.1

[56] References Cited

U.S. PATENT DOCUMENTS

| | | | |
|---|---|---|---|
| 3,348,690 | 10/1967 | Cornelissen | 210/242.3 |
| 3,701,430 | 10/1972 | Tuttle | 210/923 |
| 4,014,795 | 3/1977 | in't Veld | 210/923 |
| 4,530,760 | 7/1985 | Shimura | 210/923 |
| 4,673,497 | 6/1987 | Lundin | 210/923 |
| 4,690,093 | 9/1987 | Lundin | 210/242.3 |
| 4,957,636 | 9/1990 | Wilson | 210/923 |
| 5,043,065 | 8/1991 | Propp | 210/923 |

Primary Examiner—Christopher Upton
Attorney, Agent, or Firm—Ezra L. Schacht

[57] ABSTRACT

A barge for cleaning the surface of water is disclosed. The vessel has a hull with a vertical bow line, a bow angle of over 90 degrees, a flat bottom and parallel sides. An inlet for surface water and contaminants is located on each side of the barge, toward the stern, and is covered with a grill. Pumped water is used to clean the grill and to push waste sternward along the sides of the barge.

1 Claim, 4 Drawing Sheets

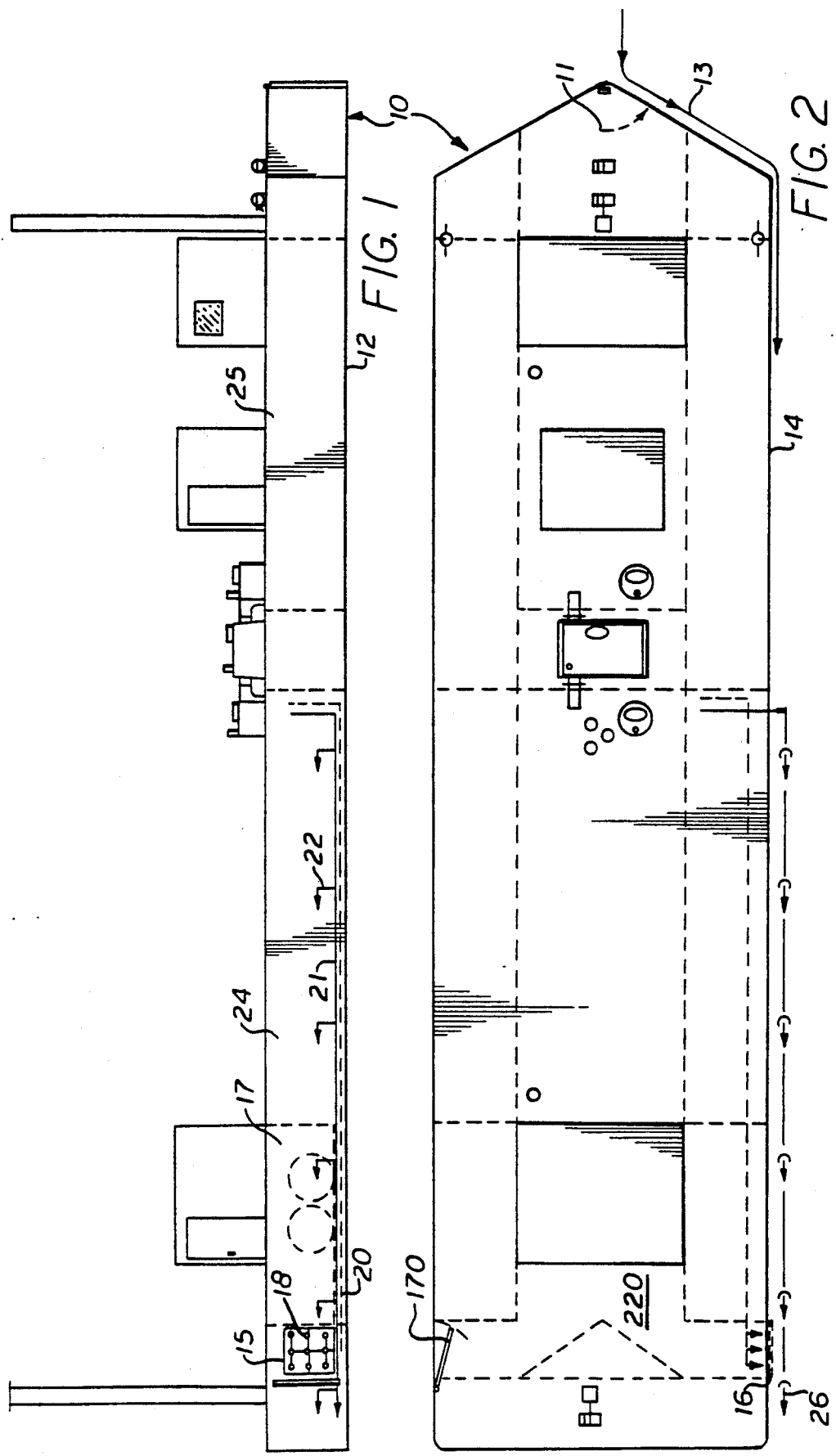

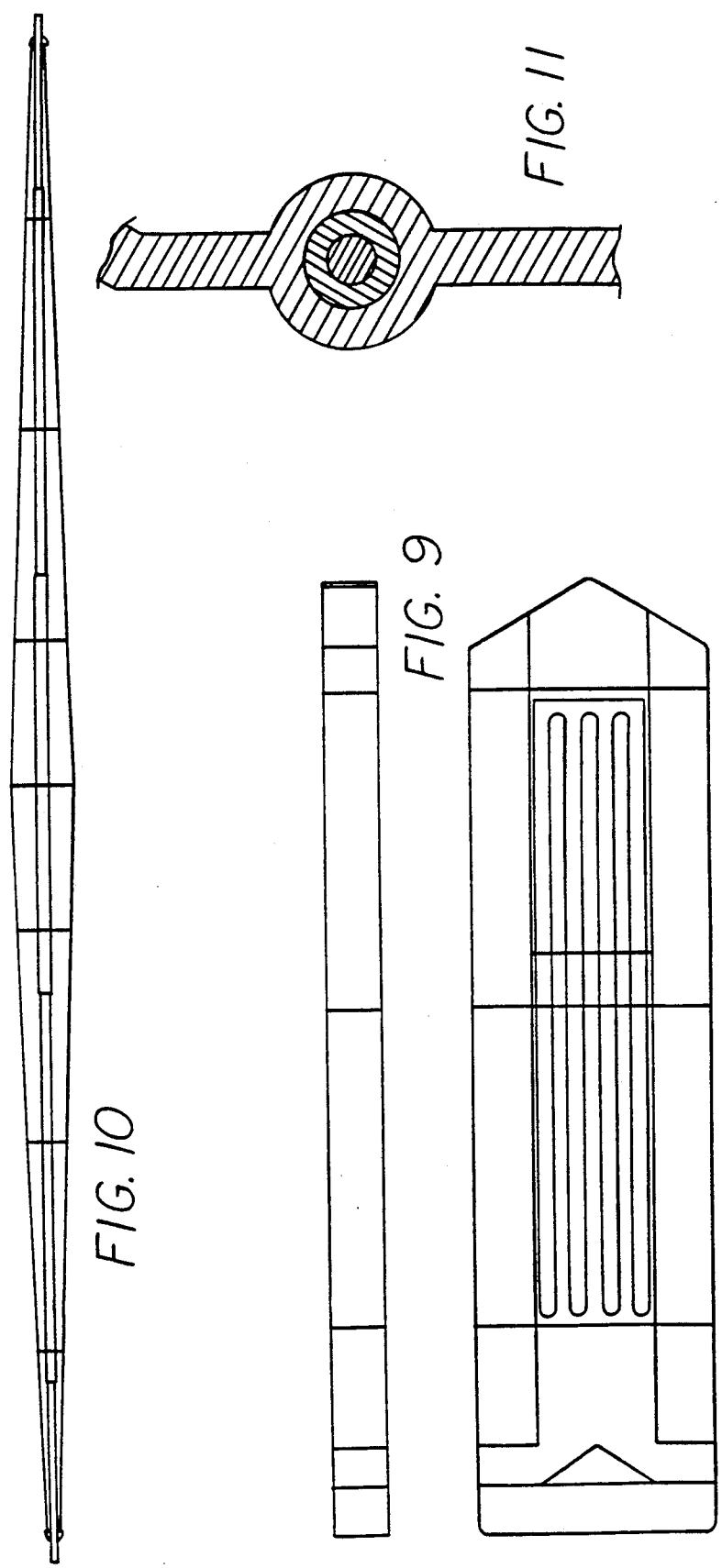

SHALLOW WATER OIL-SKIMMING BARGE

DISCLOSURE DOCUMENT

Disclosure Document No. 300740 was filed on Dec. 19, 1991 for some of the inventive concepts herein.

BACKGROUND OF THE INVENTION

Oil skimmers of various designs have been proposed to more efficiently skim oils of various viscosities from the surface of liquids. This invention is particularly concerned with shallow drafts and trash laden water.

SUMMARY OF THE INVENTION

In the present invention, the design of the bow of the barge is not square, notched, equipped with pontoons or of traditional nautical streamlined design.

It is instead formed at an obtuse angle of about 120 degrees, with both sides of the bow rising vertically from the flat bottom as shown in FIGS. 1 and 2. The obtuse angular shape results in a smooth parting of the oil-covered water, wherein the divided stream clings to the hull of the barge and more easily flows into the screened openings through the removable screens. The generous size of the screens makes it possible for a substantial amount of oil and water to flow into the separation compartment.

The obtuse angle of the bow and its vertical construction prevent the barge from riding up and over the oil, and help to direct the oil back along the hull to the inlet screens.

A copious amount of water is used in separating the oil from the water, and a portion is returned to the body of water on which the barge is floating. Before this water is returned it performs two functions: 1. A portion is ejected sternward along the hull of the barge from a series of jet nozzles, in this way urging the oil toward the screened inlets, and 2. The remaining portion is periodically forced out through nozzles just inside the screens and thus helps to keep the screens clear of debris. The first portion helps to drive the detached debris sternward and reduces the possibility of reclogging of the screen, at least with that debris.

An easily disassembled rotor of thin blades, similar in appearance to a blower rotor, skims effectively and provides the oportunity, for example, to heat these blades for use with thick oils in cold temperatures.

BRIEF DESCRIPTION OF THE DRAWINGS

The figures in the appended drawings show the following:

FIG. 1 is a side elevation of the barge as seen from the right;

FIG. 2 is a view of the barge from above; and

FIG. 9 shows the heating pipes which are run fore and aft to thin out heavy oils for ease of processing;

FIG. 10 is a pictorial drawing of the telescoping floating boom of aluminum pipe and sheet, which may be used with this barge; and FIG. 11 is a crossection of an extruded aluminum skimblade with an insulated electrical resistance rod incorporated, for connection to insulated and electrified endplates.

DESCRIPTION OF THE PREFERRED EMBODIMENT

Figure 3:
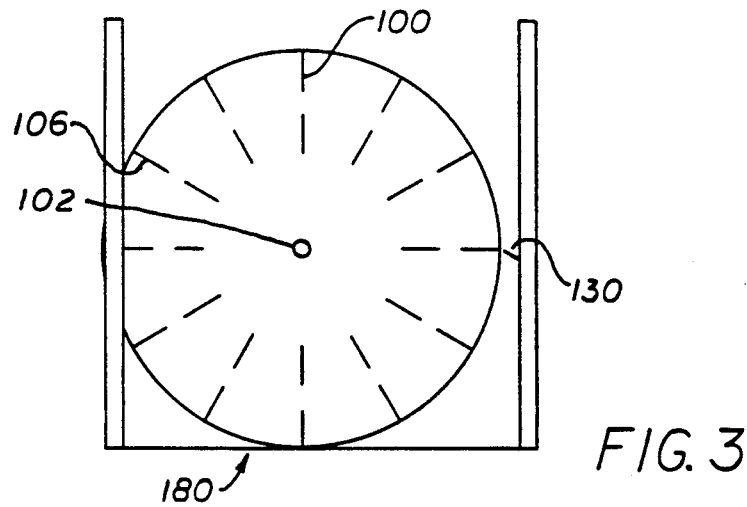
FIGS. 3, 4, and 5 are views of the impeller in radial crossection, in longitudinal view, and in exploded pictorial versions.
Figure 4:
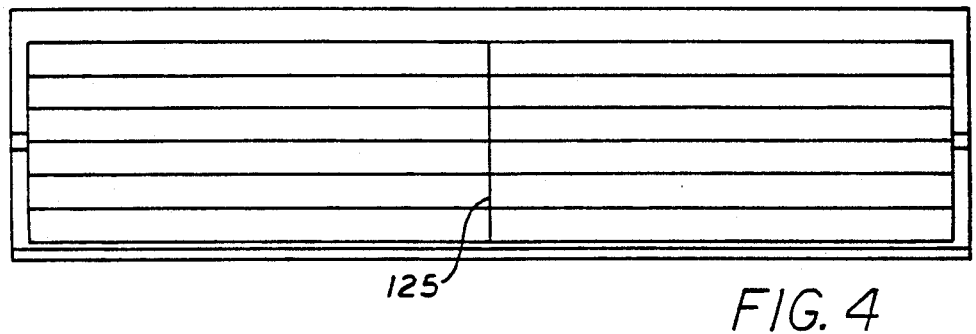

As shown in FIGS. 1 and 2, the bow 10 is formed at an obtuse angle 11 of about 120 degrees, with both sides of the bow 10 rising vertically from the flat bottom 12. The obtuse angular shape 11 results in a smooth parting of the oil-covered water 12, wherein the divided oil stream 13 clings to the hull of the barge 14 and more easily flows into the screened openings 15 through the removable screens 16. The generous size of the screens 16 makes it possible for a substantial amount of oil and water to flow into the separation compartment 17.

The screens 16, however, trap most of the trash, floating marine vegetation, and large oil clots which must then be removed, either by rejection or by being reduced to a size which can be pulled through the screen 16.

A grid of high-pressure water nozzles 18 is installed behind the screen 16, connected in a matrix of pipe nipples to a pipe 20 connected to the output of a suitable pump (not shown).

An additional high pressure water conduit 21 is run along the hull, with at least the outlets outside the hull, from a pump (not shown), and feeds a series of elbow-like fittings 22, the purpose of which is to expel water in a sternward direction.

The primary purpose of these "ell-jets" 22 is to provide a useful function for the expelled water which had been used in assisting the water-oil separation process, and is then conventionally discharge to the body of water. By the sternward diversion of water, additional impetus is given to the stream of oil 13 along the hull 14 to move more quickly to the inlet screen.

This ejected water, then, performs two tasks: 1. as it jets out along the hull toward the stern, it urges the oil toward the screens, and it also pushes the flotsam and jetsam away from the screens 16.

There may appear to be more water than is necessary in the harvested oil, but it has been determined that a reasonably thick cushion of water causes the oil to move more efficiently to the cargo tanks 24 and 25.

A part of this ejected oil is fed directly from the pumps through piping to a series of high pressure water nozzles 18, which are positioned interior to but facing the inlet screens. These powerful water jets, preferably of heated water, are positioned to periodically expel any trash, clumps of heavy oil, tangles of seaweed or dead fish that may be caught in the screen 16. Such expelled debris is then entrained in the water jets ejected from the ell discharges 26 sternward of the screen.

It may thus be seen that a combination of functions are performed at one time in this versatile barge.

Figure 5:
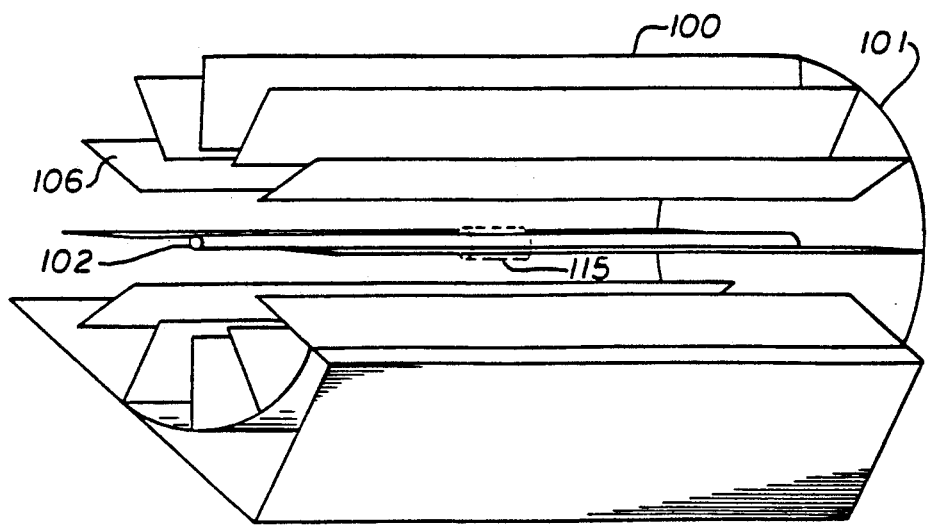

In FIGS. 3 and 5, it may be noted that the skimblades 100 are assembled without the usual drums. The skimblades 100 are mounted between the endplates 101 which are secured to the driveshaft 102.

Figure 6:
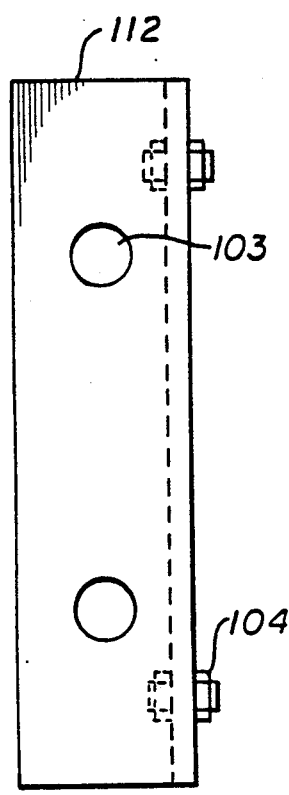
FIGS. 6, 7 and 8, are crossectional views of skimblades used with this apparatus.
Figure 7:
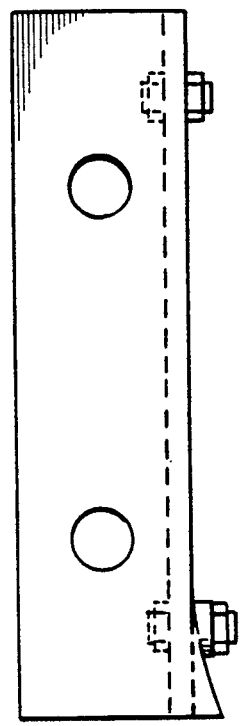
Figure 8:
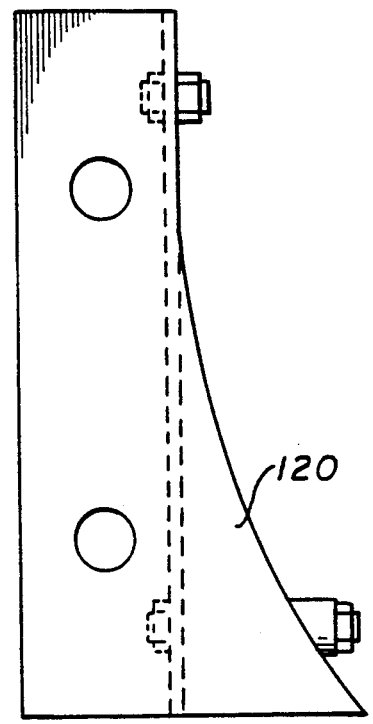

In FIGS. 6, 7 and 8, are shown one type of fastening means for the skimblades 100 to the endplates 101, for example by connectors 112. Connectors 112 may be secured to endplates 101 permanently with rivets or bolts through holes 103 in brackets 112, or they may be welded to endplates 101. The resulting combination endplate 101 and its brackets 102 is relatively easy to hoist in and out of the hatch and can be secured to the shaft 102 in the tank. The skimblades 100 can be fastened through matching apertures 104 on brackets and on skimblades 100, or some quick-connect devices, so that the skimblades 100 can be quickly and easily replaced, while underway, from a stock of spares of various contours kept on board.

The skimblades 100 can be flat and fastened directly to rib surface 106 with some preferred quick-connect devices 107. On the other hand, skimblades 110 with a curved or angled contour may be needed for best oil retrieval. Spacers 120 may be required to secure such skimblades 110 to such surfaces as 106.

Skimblades 100 may be formed in a single press-brake operation from tough aluminum strips of any suitable thickness. Alternately skimblades of thinner metal may used with support rings 125 as shown.

Alternately skimblades may be extruded in cored fashion as shown in FIG. 11. An insulated electrical heater may be inserted in the bore, connectable at both ends to portions of the endplates 101, which of course would require at least some insulated portions. Shaft 102 would also require an electrically insulting barrier 115 as shown. Such modifications are not beyond the state of the art.

A spillover device 130 of some type will be required to remove the oil from the tank 180. With this design, it is virtually impossible to clog the skimblade assembly. Small bits of flotsam and jetsam which entered through the apertures in the screens 16 cannot be jammed against a non-existant drum.

The screens 16 are removable, and covered with hinged doors 170. These doors 170 can be held partially open and have a damping effect by keeping the water from rushing in and out of the skimming compartment, between screens 16 on either side of the barge.

The two screened openings facing each other in the sides of the barge compartment, coverable with screens 16 and hinged doors 170, permit the hawsers and ropes used in confining the spill to be drawn through the skimming compartment and cleaned as they pass through. The removed oil can then be added to the reservoir.

It may also be noted that if both doors 170 are sealed shut. another compartment 220 for oil storage has been made available.

What is claimed is:

1. A water surface cleaning barge, comprising:
   a. a hull;
   b. said hull having a vertical bow line, and an obtuse bow angle of over 90 degrees, a flat bottom of shallow draft, parallel sides, a plurality of compartments and intake means for surface water and contaminants therein;
   c. said intake means comprising a coarse mesh grill, one of said grills located toward the stern on each of said parallel vertical sides, said grills in alignment with an axis extending from side to side of said barge within one of said compartments of said barge;
   d. said hull having pumping means for water and piping means from the pumping means to grill cleaning means and to surface waste thrusting means, said grill cleaning means ejecting water under pressure to clear the grill of debris, said surface waste thrusting means pushing waste sternward along said sides of said barge, said pushing action driving a larger portion of said waste into said grille, and a portion of said debris detached from said grill sternward out of suction range of said grill.

* * * * *